(12) United States Patent
Baradaran et al.

(10) Patent No.: US 11,379,443 B2
(45) Date of Patent: Jul. 5, 2022

(54) DETECTING OUTLIERS IN SERVER TRANSACTION TIME AS A FORM OF TIME SERIES DATA

(71) Applicant: Citrix Systems, Inc., Fort Lauderdale, FL (US)

(72) Inventors: Nastaran Baradaran, San Jose, CA (US); Deepak Nagaraj, Sunnyvale, CA (US); Muraliraja Muniraju, Fremont, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/920,977

(22) Filed: Jul. 6, 2020

(65) Prior Publication Data

US 2020/0334216 A1 Oct. 22, 2020

Related U.S. Application Data

(63) Continuation of application No. 15/496,871, filed on Apr. 25, 2017, now Pat. No. 10,706,028.

(51) Int. Cl.
*G06F 17/18* (2006.01)
*G06F 16/21* (2019.01)
(Continued)

(52) U.S. Cl.
CPC ............ *G06F 16/217* (2019.01); *G06F 11/00* (2013.01); *G06F 11/3082* (2013.01);
(Continued)

(58) Field of Classification Search
CPC .... G06F 16/217; G06F 11/00; G06F 11/3082; G06F 11/3409; G06F 11/3433;
(Continued)

(56) References Cited

U.S. PATENT DOCUMENTS 9,336,484 B1\* 5/2016 Iverson ............... G06F 16/2465
10,429,203 B1\* 10/2019 Brandmaier ........... G01C 21/20
(Continued)

OTHER PUBLICATIONS

Mahmood Deypir, Mohammad Hadi Sadreddini, Sattar Hashemi "Towards a variable size sliding window model for frequent itemset mining over data streams," Feb. 2012, Computers & Industrial Engineering 63, 161-172. (Year: 2012).\*
(Continued)

*Primary Examiner* — Mohamed Charioui
*Assistant Examiner* — Christine Y Liao
(74) *Attorney, Agent, or Firm* — Foley & Lardner LLP

(57) ABSTRACT

Described embodiments provide systems and methods for detecting outliers on a series of data. A device receives a plurality of data points and adds a received data point to a first window of data comprising at least a predetermined number of received data points from the plurality of data points, responsive to detecting that the received data point is not an outlier from the first window of data. The device detects that one or more next data points of the received plurality of data points are outliers from the first window of data and determines that a count of the one or more next data points that are outliers exceeds a predetermined threshold. In response, the device establishes a replacement window of data.

20 Claims, 8 Drawing Sheets

(51) Int. Cl.

| | |
|---|---|
| *H04L 41/142* | (2022.01) |
| *G06Q 10/06* | (2012.01) |
| *H04L 43/067* | (2022.01) |
| *H04L 43/04* | (2022.01) |
| *H04L 43/022* | (2022.01) |
| *H04L 41/147* | (2022.01) |
| *H04L 43/0823* | (2022.01) |
| *H04L 43/16* | (2022.01) |
| *G06F 11/30* | (2006.01) |
| *G06F 11/00* | (2006.01) |
| *G06F 11/34* | (2006.01) |
| *G06F 21/31* | (2013.01) |

(52) U.S. Cl.
CPC ....... *G06F 11/3409* (2013.01); *G06Q 10/063* (2013.01); *H04L 41/142* (2013.01); *H04L 41/147* (2013.01); *H04L 43/022* (2013.01); *H04L 43/04* (2013.01); *H04L 43/067* (2013.01); *H04L 43/0823* (2013.01); *H04L 43/16* (2013.01); *G06F 11/3433* (2013.01); *G06F 21/316* (2013.01)

(58) Field of Classification Search
CPC ... G06F 21/316; G06Q 10/063; H04L 41/142; H04L 41/147; H04L 43/022; H04L 43/04; H04L 43/067; H04L 43/0823; H04L 43/16
See application file for complete search history.

(56) References Cited

U.S. PATENT DOCUMENTS

| | | | |
|---|---|---|---|
| 2008/0167837 | A1 | 7/2008 | Basak et al. |
| 2011/0113009 | A1* | 5/2011 | Gupta ............... G06F 16/24568 707/609 |
| 2012/0324097 | A1* | 12/2012 | Myers ................ G06F 11/3433 709/224 |
| 2013/0046727 | A1* | 2/2013 | Jones ................ G01N 33/0004 706/52 |
| 2013/0110761 | A1* | 5/2013 | Viswanathan .... G06F 16/24578 706/52 |
| 2016/0087861 | A1* | 3/2016 | Kuan .................... H04L 43/065 709/224 |

OTHER PUBLICATIONS

Non-Final Office Action on U.S. Appl. No. 15/496,871, dated Oct. 9, 2019.
Notice of Allowance on U.S. Appl. No. 15/496,871, dated Mar. 4, 2020.

* cited by examiner

DETECTING OUTLIERS IN SERVER TRANSACTION TIME AS A FORM OF TIME SERIES DATA

CROSS-REFERENCE TO RELATED APPLICATION

This application is a continuation of and claims priority to and the benefit of U.S. patent application Ser. No. 15/496,871, titled "DETECTING OUTLIERS IN SERVER TRANSACTION TIME AS A FORM OF TIME SERIES DATA," and filed on Apr. 25, 2017, the contents of all of which are hereby incorporated herein by reference in its entirety for all purposes.

BACKGROUND

Complex systems benefit from performance monitoring, by which deviation from a norm may be detected. In some contexts, it may be difficult to establish a norm. For example, systems handling workloads that vary based on outside factors may exhibit changes in performance that are related to the outside factors and should still be considered within a range of normal. This variation in normality makes it difficult for an automated performance monitoring system to detect deviation from the norm.

SUMMARY

This Summary is provided to introduce a selection of concepts in a simplified form that are further described below in the Detailed Description. This Summary is not intended to identify key features or essential features, nor is it intended to limit the scope of the claims included herewith.

In at least one aspect, described is a method for detecting outliers on a series of data. The method includes receiving, by a device, a plurality of data points and adding, by the device, a received data point to a first window of data comprising at least a predetermined number of received data points from the plurality of data points, responsive to detecting that the received data point is not an outlier from the first window of data. The method includes detecting, by the device, that one or more next data points of the received plurality of data points are outliers from the first window of data and determining, by the device, that a count of the one or more next data points that are outliers exceeds a predetermined threshold. The method includes establishing, by the device, responsive to determining that the count exceeds the predetermined threshold, a second window of data comprising at least one of the one or more next data points In at least one aspect, described is a system for outlier detection on a series of data. The system includes a processor coupled to memory and configured to execute instructions to receive a plurality of data points; add a received data point to a first window of data comprising at least a predetermined number of received data points from the plurality of data points, responsive to detecting that the received data point is not an outlier from the first window of data; and detect that one or more next data points of the received plurality of data points are outliers from the first window of data. The processor is configured to execute instructions to determine that a count of the one or more next data points that are outliers exceeds a predetermined threshold and to establish, responsive to determining that the count exceeds the predetermined threshold, a second window of data comprising at least one of the one or more next data points.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

One aspect of performance monitoring is to accumulate values for one or more performance-related metrics and identify any sudden or unexpected changes. When there are such changes, a performance monitoring system might, for example, generate alerts and/or trigger corrective actions. For example, in a distributed computing context or in a data center context, a monitoring system may need to detect when a server has potentially failed. The monitoring system might react to the potential failure by, for example, restarting the server, signaling an administrator to evaluate the server, or by reconfiguring a load balancer to redirect work to other servers.

To determine that there has been a sudden or unexpected change, the monitor first establishes a baseline for normal values of the one or more performance-related metrics. In some instances, the normal range might be configured by an administrator. However, in some contexts, the normal range may be responsive to dynamic conditions and environmental factors such as time-of-day, variations in traffic profiles, network topology, and so forth. One technique is to accumulate a set of measurements and compare future measurements to the accumulated set. If the new measurement is a statistical outlier from the set, it may indicate a problem.

However, in some instances, the values gathered for the one or more performance-related metrics might not accurately indicate a normal state. This may happen, for example, where contextual changes result in a new normal state. Accordingly, monitoring systems face a technical problem distinguishing between problematic unexpected values for these metrics as compared to a shift in normal expected values for the metrics.

Figure 1A:
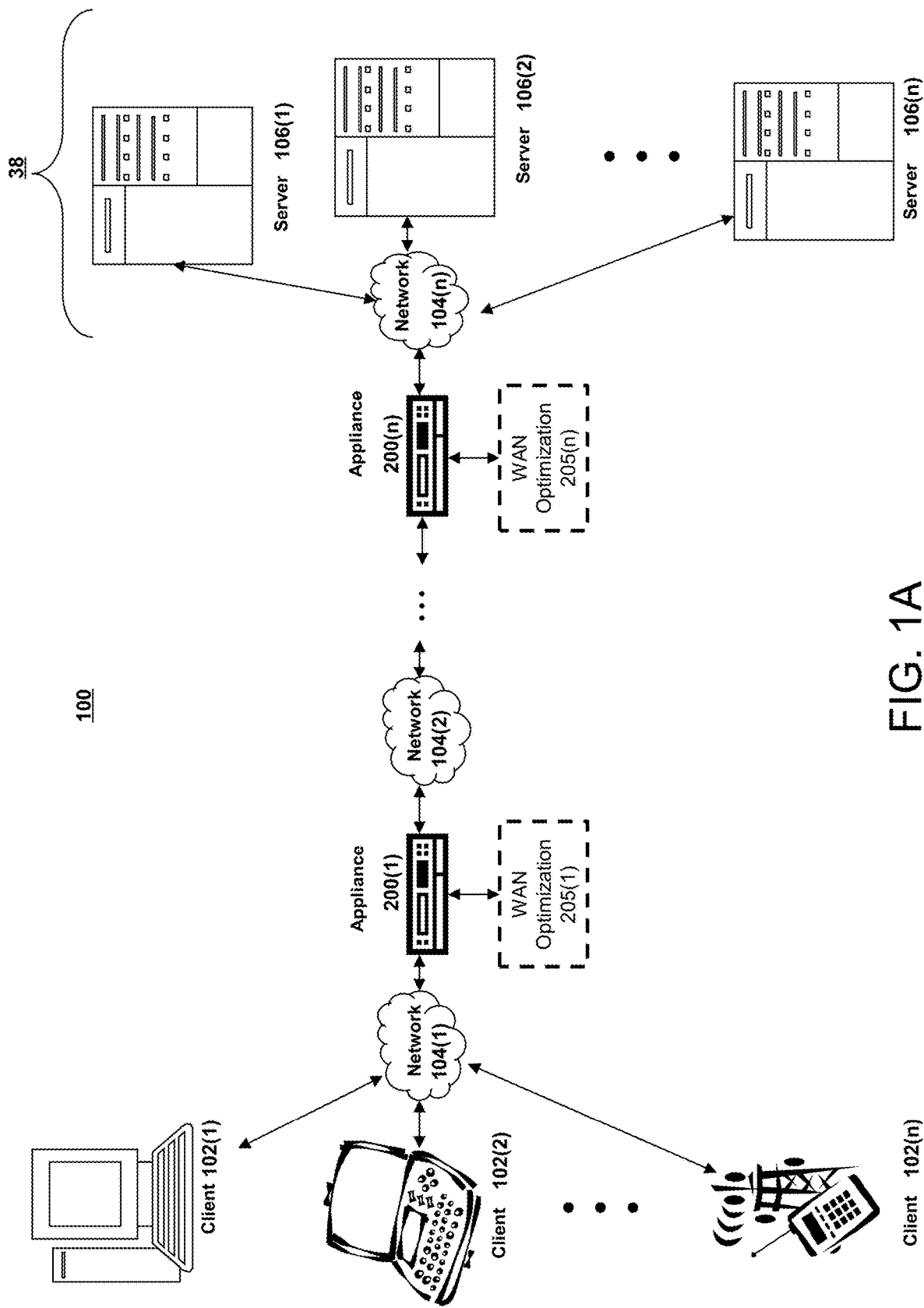
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
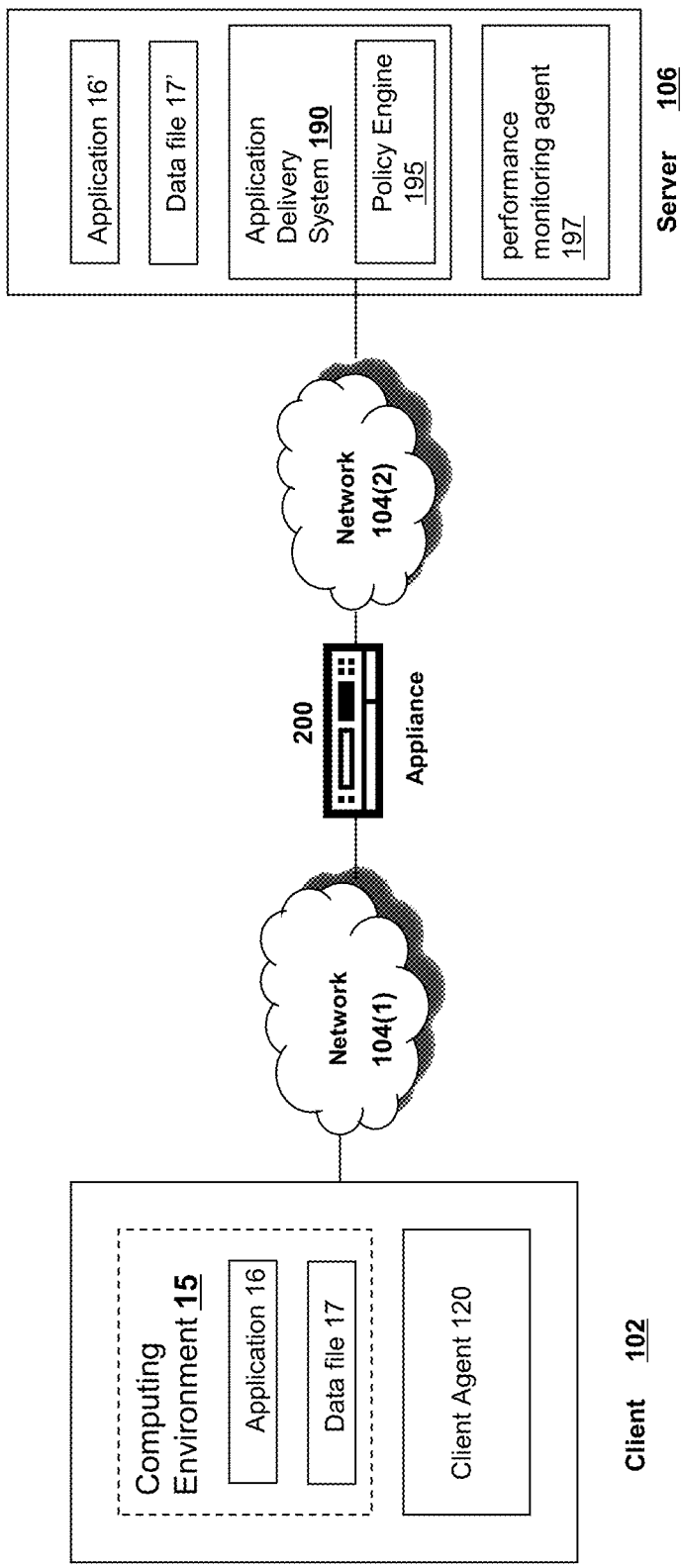
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
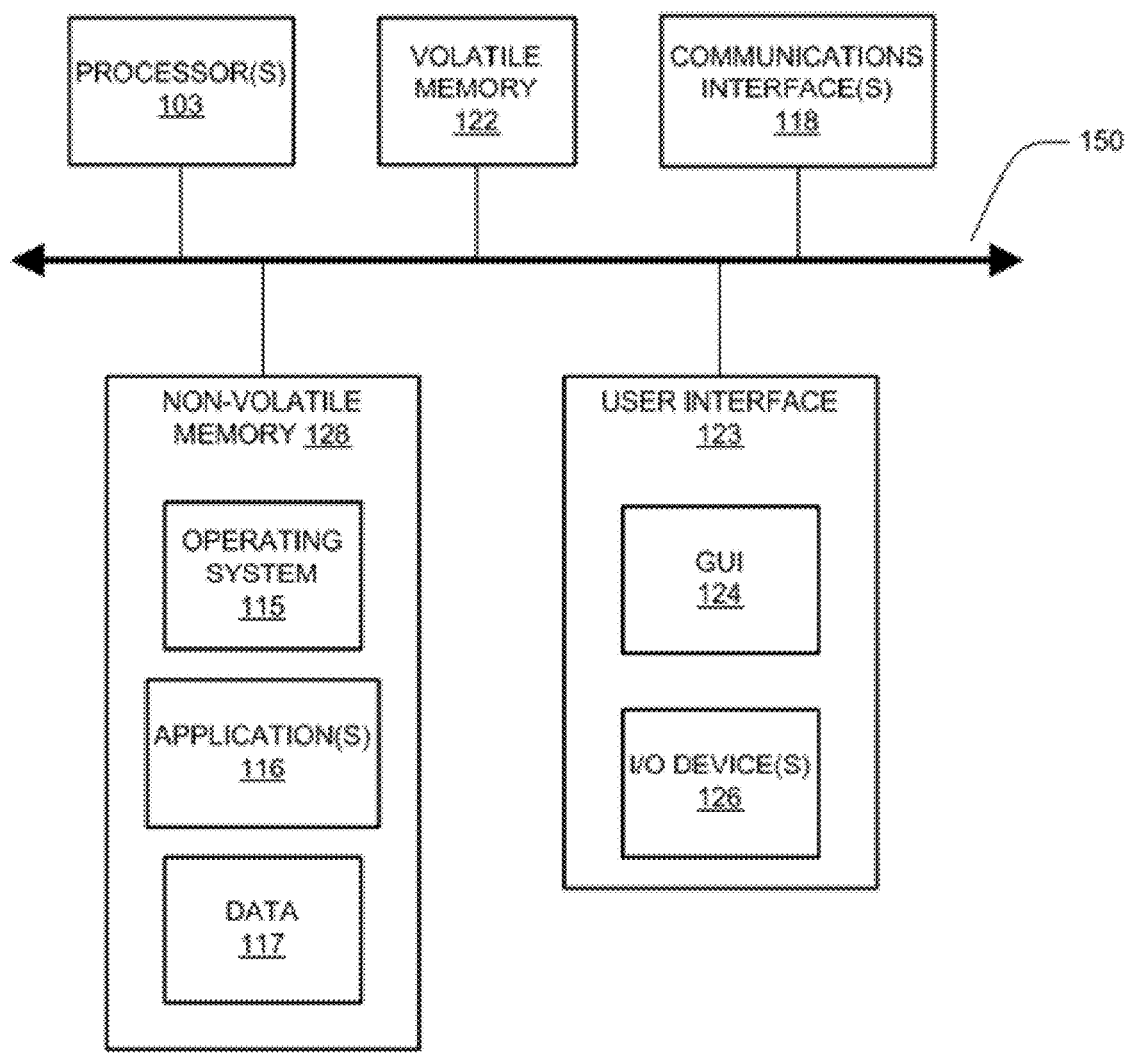
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

Figure 2:
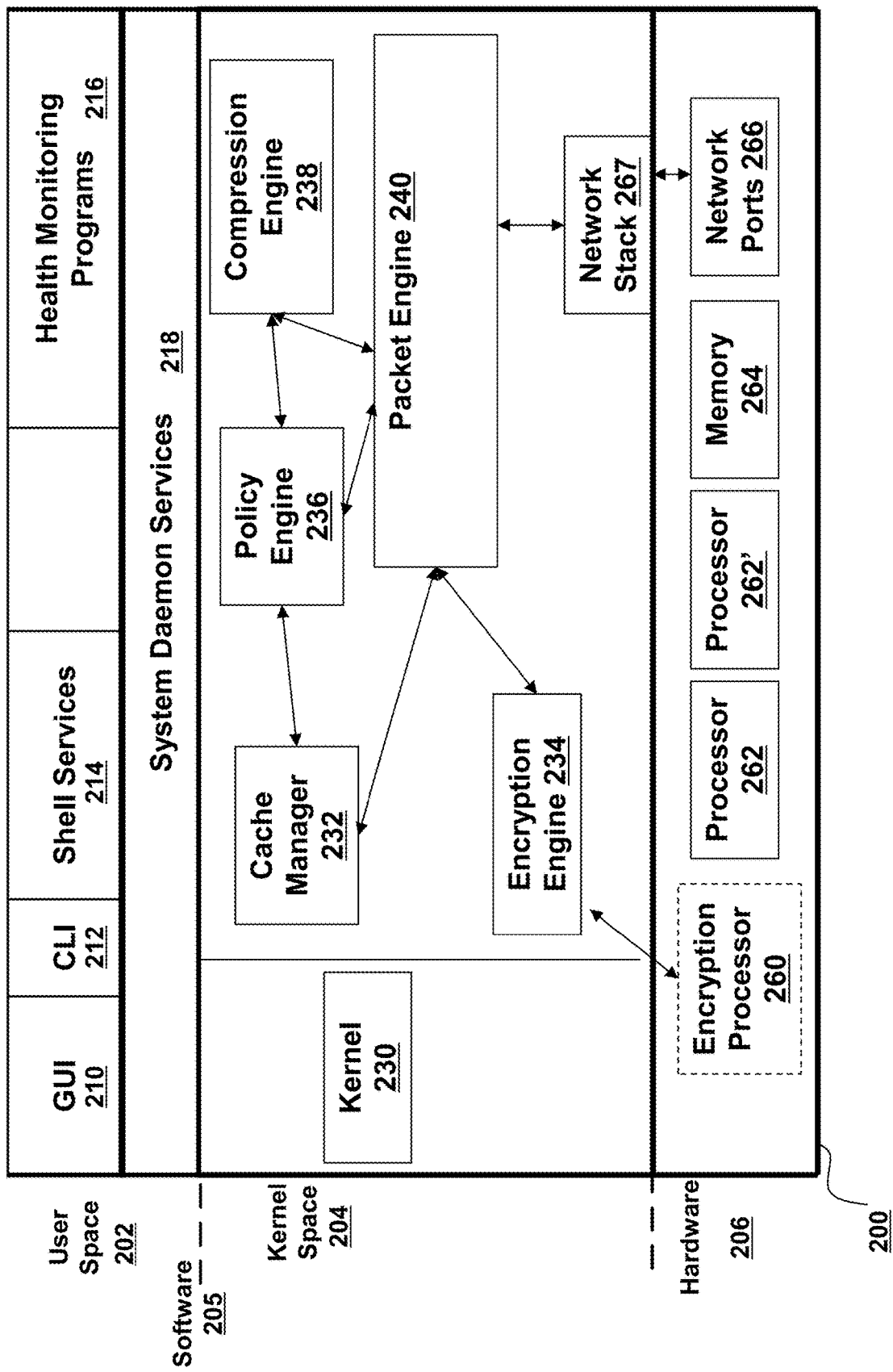
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

Figure 3:
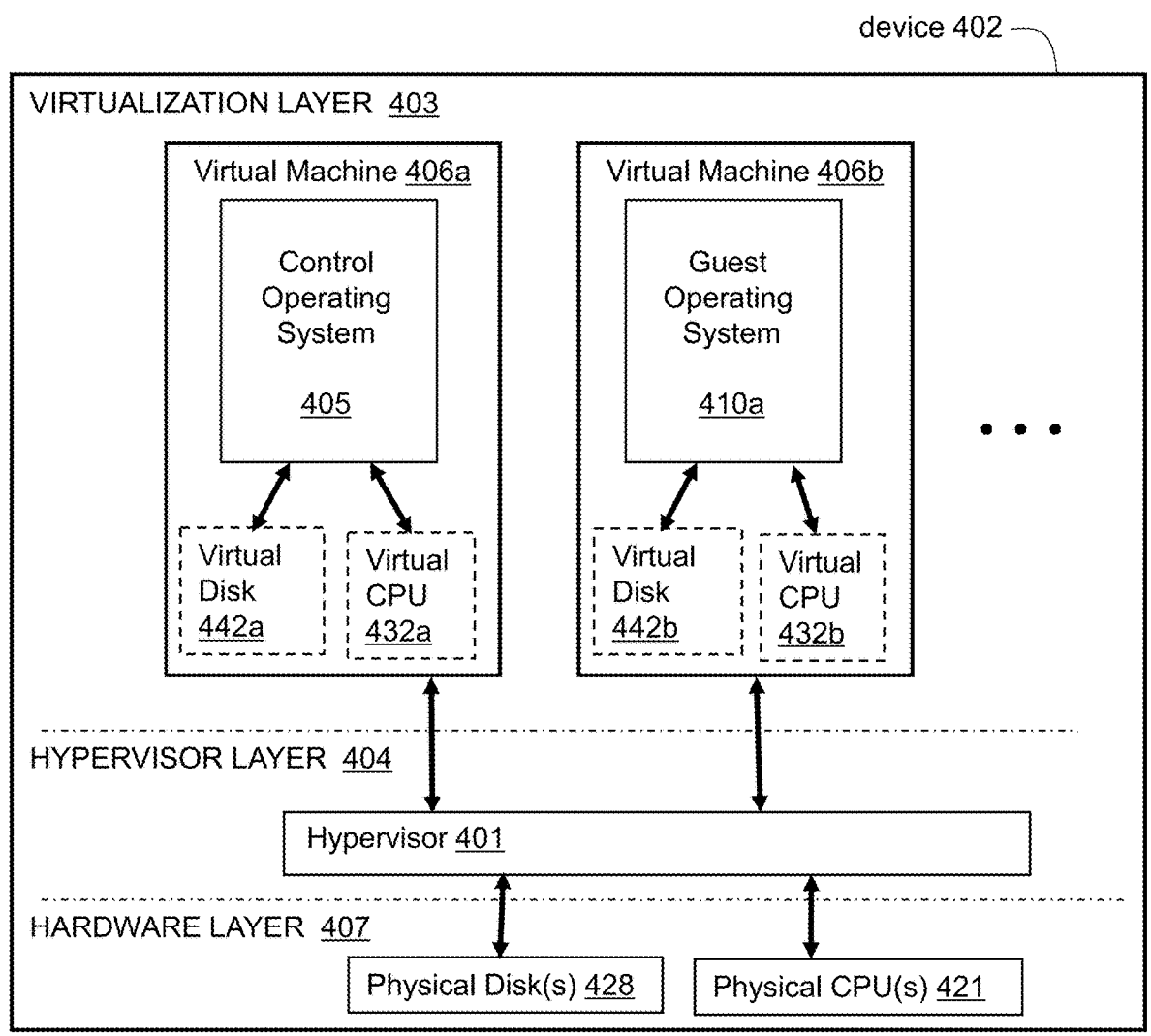
FIG. 3 is a block diagram of a virtualization environment, in accordance with an illustrative embodiment.

Referring now to FIG. 3, a block diagram of a virtualized environment 400 is shown. As shown, a computing device 402 in virtualized environment 400 includes a virtualization layer 403, a hypervisor layer 404, and a hardware layer 407. Hypervisor layer 404 includes one or more hypervisors (or virtualization managers) 401 that allocates and manages access to a number of physical resources in hardware layer 407 (e.g., physical processor(s) 421 and physical disk(s) 428) by at least one virtual machine (VM) (e.g., one of VMs 406) executing in virtualization layer 403. Each VM 406 may include allocated virtual resources such as virtual processors 432 and/or virtual disks 442, as well as virtual resources such as virtual memory and virtual network interfaces. In some embodiments, at least one of VMs 406 may include a control operating system (e.g., 405) in communication with hypervisor 401 and used to execute applications for managing and configuring other VMs (e.g., guest operating systems 410) on device 402.

In general, hypervisor(s) 401 may provide virtual resources to an operating system of VMs 406 in any manner that simulates the operating system having access to a physical device. Thus, hypervisor(s) 401 may be used to emulate virtual hardware, partition physical hardware, virtualize physical hardware, and execute virtual machines that provide access to computing environments. In an illustrative embodiment, hypervisor(s) 401 may be implemented as a XEN hypervisor, for example as provided by the open source Xen.org community. In an illustrative embodiment, device 402 executing a hypervisor that creates a virtual machine platform on which guest operating systems may execute is referred to as a host server. In such an embodiment, device 402 may be implemented as a XEN server as provided by Citrix Systems, Inc., of Fort Lauderdale, Fla.

Hypervisor 401 may create one or more VMs 406 in which an operating system (e.g., control operating system 405 and/or guest operating system 410) executes. For example, the hypervisor 401 loads a virtual machine image to create VMs 406 to execute an operating system. Hypervisor 401 may present VMs 406 with an abstraction of hardware layer 407, and/or may control how physical capabilities of hardware layer 407 are presented to VMs 406. For example, hypervisor(s) 401 may manage a pool of resources distributed across multiple physical computing devices.

In some embodiments, one of VMs 406 (e.g., the VM executing control operating system 405) may manage and configure other of VMs 406, for example by managing the execution and/or termination of a VM and/or managing allocation of virtual resources to a VM. In various embodiments, VMs may communicate with hypervisor(s) 401 and/or other VMs via, for example, one or more Application Programming Interfaces (APIs), shared memory, and/or other techniques.

In general, VMs 406 may provide a user of device 402 with access to resources within virtualized computing environment 400, for example, one or more programs, applications, documents, files, desktop and/or computing environments, or other resources. In some embodiments, VMs 406 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 402, virtualized environment 400 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 400 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 400 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 406, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 400) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

Figure 4:
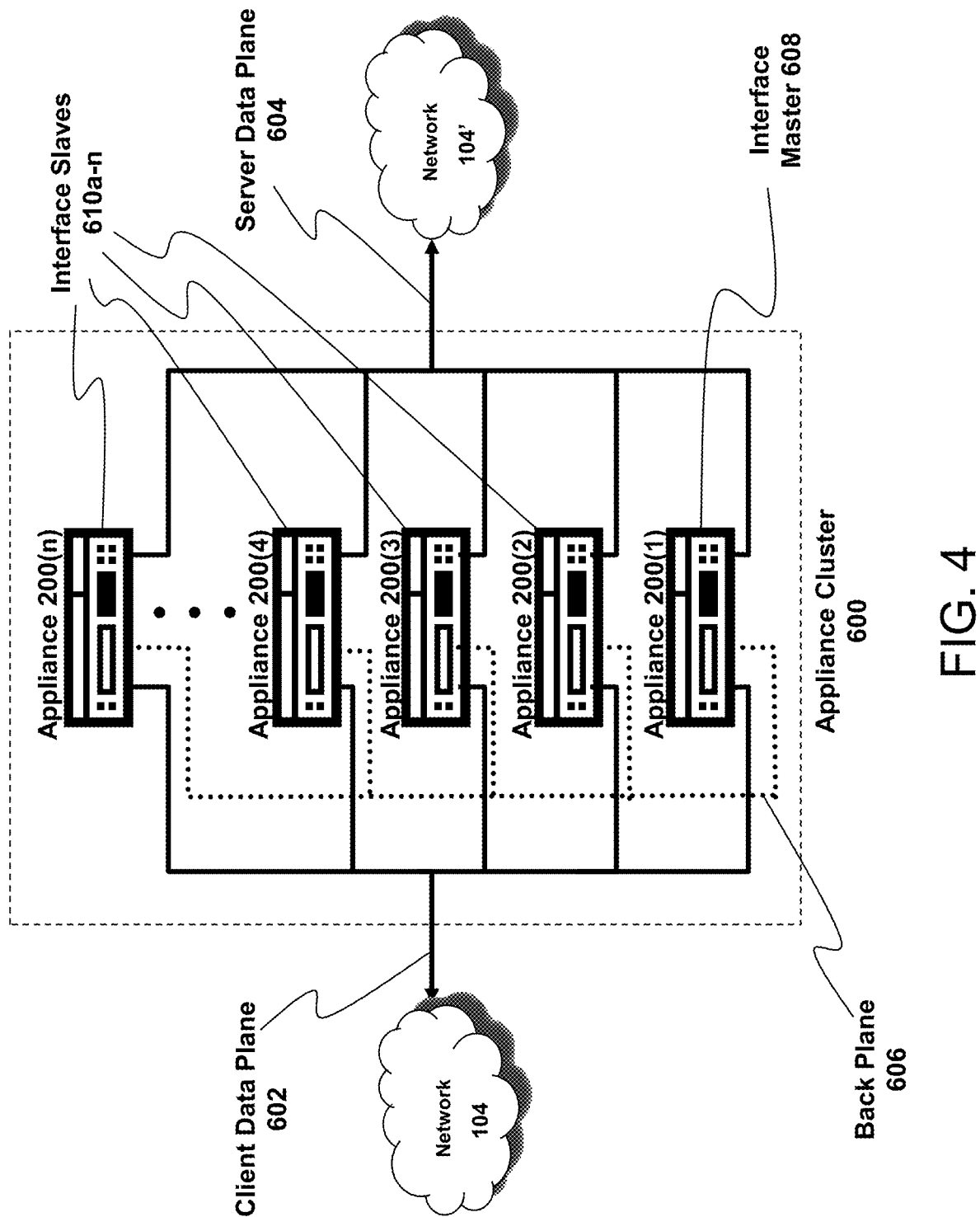
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 600. A plurality of appliances 200 or other computing devices (e.g., nodes) may be joined into a single cluster 600. Cluster 600 may operate as an application server, network storage server, backup service, or any other type of computing device to perform many of the functions of appliances 200 and/or 205.

In some embodiments, each appliance 200 of cluster 600 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 600 may be physically grouped or geographically proximate to one another, such as a group of blade servers or rack mount devices in a given chassis, rack, and/or data center. In some embodiments, one or more of appliances 200 of cluster 600 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 600 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 600 may be coupled to a first network 104 via client data plane 602, for example to transfer data between clients 102 and appliance cluster 600. Client data plane 602 may be implemented a switch, hub, router, or other similar network device internal or external to cluster 600 to distribute traffic across the nodes of cluster 600. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 600 may be coupled to a second network 104' via server data plane 604. Similarly to client data plane 602, server data plane 604 may be implemented as a switch, hub, router, or other network device that may be internal or external to cluster 600. In some embodiments, client data plane 602 and server data plane 604 may be merged or combined into a single device.

In some embodiments, each appliance 200 of cluster 600 may be connected via an internal communication network or back plane 606. Back plane 606 may enable inter-node or inter-appliance control and configuration messages, for inter-node forwarding of traffic, and/or for communicating configuration and control traffic from an administrator or user to cluster 600. In some embodiments, back plane 606 may be a physical network, a VPN or tunnel, or a combination thereof.

In some embodiments, a router may be connected to an external network 104, and connected to a network interface of each appliance 200. In some embodiments, this router or switch may be referred to as an interface manager or interface master 608, and may further be configured to distribute traffic evenly across the nodes in the appliance cluster 600. In some embodiments, the interface master 608 may comprise a flow distributor external to appliance cluster 600. In other embodiments, the interface master 608 may comprise one of the appliances 200 in the appliance cluster 600. For example, a first appliance 200(1) may serve as the interface master 608, receiving incoming traffic for the appliance cluster 600 and distributing the traffic across each of appliances 200(2)-200(n). In some embodiments, return traffic may similarly flow from each of appliances 200(2)-200(n) via the first appliance 200(a) serving as the interface master 608. In other embodiments, return traffic from each of appliances 200(2)-200(n) may be transmitted directly to a network 104, 104', or via an external router, switch, or other device. In some embodiments, appliances 200 of the appliance cluster not serving as an interface master may be referred to as interface slaves 610(a)-610(n).

The interface master 608 may perform load balancing or traffic flow distribution in any of a variety of ways. For example, in some embodiments, the interface master 608 may comprise a router performing equal-cost multi-path (ECMP) routing with next hops configured with appliances or nodes of the cluster. The interface master may use an open-shortest path first (OSPF). In some embodiments, the interface master 608 may use a stateless hash-based mechanism for traffic distribution, such as hashes based on IP address or other packet information tuples, as discussed above. Hash keys and/or salt may be selected for even distribution across the nodes. In other embodiments, the interface master 608 may perform flow distribution via link aggregation (LAG) protocols, or any other type and form of flow distribution, load balancing, and routing.

Additional details of cluster 600 may be as described in U.S. Pat. No. 9,538,345, issued Jan. 3, 2017 to Citrix Systems, Inc. of Fort Lauderdale, Fla., the teachings of which are hereby incorporated herein by reference.

Some embodiments include a monitor node such as a client 102, a server 106, a client agent 120, an appliance 200, a virtual appliance in a virtualized environment 400, an appliance cluster 600, a master node for an appliance cluster 600 (such as the interface master 608), or any other device capable of performing the monitoring functions described. As introduced above, one aspect of performance monitoring is to accumulate values for one or more performance-related metrics and identify any sudden or unexpected changes. The monitor node accumulates values for performance metrics corresponding to the performance of one or more monitored devices, such as a client 102, a server 106, an appliance 200, a virtual appliance in a virtualized environment 400, an appliance cluster 600, a participant node for an appliance cluster 600 (such as the interface slave 610), or any other device that might be monitored as described. In the following description a monitor is described as accumulating data for performance of servers. However, this should not be read as limited to servers; any device may be monitored in the manner described. Likewise, in some embodiments described below, the monitor persists data in a database. However, any data storage context or device may be used to persist data; the term database should not be read to restrict or limit to any particular data storage or organizing implementation.

The monitor node determines whether a data point is an outlier based on available data corresponding to what the monitor node should expect for the data point. For example, in some embodiments, the monitor node establishes a set of boundaries marking an expected range for the data point, beyond which it would be considered an outlier. In some such embodiments, one end of the range may be fixed at a lower boundary (e.g., zero) and the other end of the range may be set to an upper boundary (an upper threshold). Where data point values are always positive, they monitor node need only compare the values to the upper threshold. In some embodiments, the monitor node adjusts the boundaries (or upper boundary) based on previously received data points. For example, in some embodiments, a monitor node uses a forecasting approach for detecting outliers by comparing new measurements to an expected value based on a history of past measurements. In some such embodiments, the monitor node calculates the expected value from a sliding window of a predetermined number of previous measurements leading up to the new measurement under consideration. In some embodiments, the monitor node pads the expected value with a range of acceptable deviation, that is, the monitor node identifies a range of values that the monitor node will accept as sufficiently close to the expected value to be considered normal. For example, in a Mean model approach, an extra band, in form of factors of standard-deviation, is added above and below the calculated expected value. In another similar example, using Holt-Winters, the expected value is increased (for an upper bound) and decreased (for a lower bound) by a percentage point. This can, for example, account for noise in the measurement data. If the new measurement is outside the range of acceptable values, the monitor node will deem the new measurement an outlier. Generally, embodiments may incorporate any method of outlier detection.

In some embodiments, the monitor node omits outliers from the previous measurements included in the sliding window. Including outliers in the sliding window can skew the expected value calculations and produce inaccurate predictions. However, if the behavior being measured legitimately changes (e.g., due to a configuration change, a contextual change, etc.), this can lead to incorrectly identifying measurements as outliers. Accordingly, the monitor node maintains statistics to identify when an excessive number of outliers have been omitted and, when the statistics satisfy a reconfiguration criteria, the monitor node reconfigures to accommodate the change in behavior. For example, in some embodiments, the monitor node replaces the sliding window when a number of consecutively identified outliers exceed a threshold. In some embodiments, the sliding window is a set of training data for generating predictions, and resetting or replacing the sliding window effectively retrains the monitor node.

Figure 5:
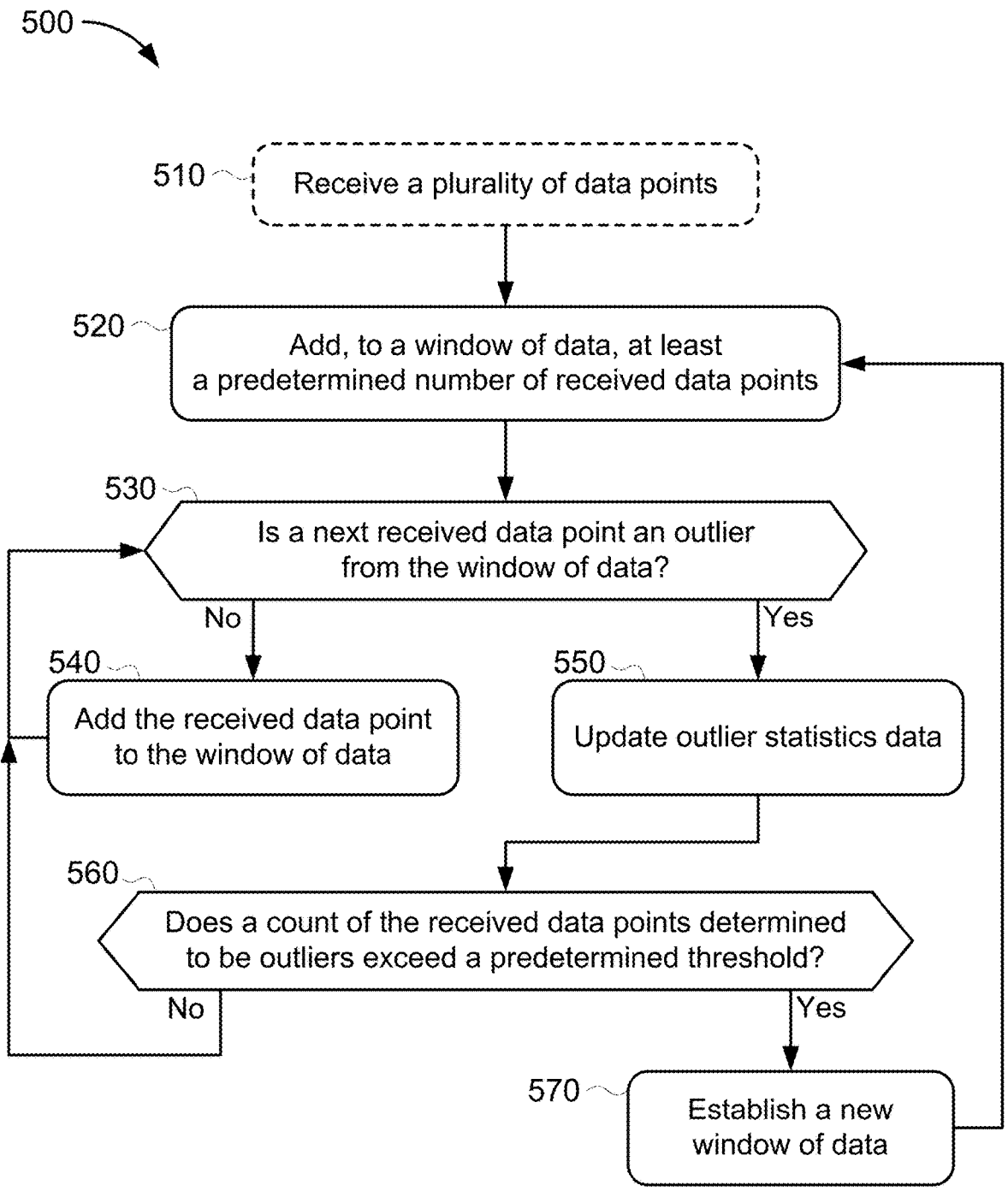
FIG. 5 is a flowchart for an example method of detecting outliers on a series of data.

FIG. 5 is a flowchart for an example method 500 of detecting outliers on a series of data. In broad overview of the method 500, at stage 510 a monitor node receives (or begins to receive) a plurality of data points. At stage 520, the monitor node adds, to a window of data, at least a predetermined number of the received data points. At stage 530, the monitor node determines whether a next received data point is an outlier from the window of data. If it isn't, then at stage 540, the monitor node adds the received data point to the window of data and the method 500 returns to stage 530 to handle another next received data point. However, if at stage 530, the monitor node determines that a next received data point is an outlier from the window of data, then at stage 550, the monitor node updates outlier statistics data. For example, in some embodiments, the monitor node maintains a count of outliers received. At stage 560, the monitor node determines whether the count of the received data points determined to be outliers exceeds a predetermined threshold. If not, then the method 500 returns to stage 530 to handle another next received data point. However, if at stage 560, the monitor node determines that the count of the received data points determined to be outliers exceeds the predetermined threshold, then at stage 570, the monitor node establishes a new window of data. In some embodiments, the last identified outlier is added to the reset window of data. The method 500 then returns to stage 520 and the monitor node adds received data points to the reset window until it again has at least the predetermined number received data points.

Referring to FIG. 5 in more detail, at stage 510 the monitor node receives (or begins to receive) a plurality of data points. In some embodiments, the monitor node receives the data points from one or more data sources, e.g., sensors, instruments, log files, etc. In some embodiments, the monitor node receives the data points in a data stream. In some embodiments, the monitor node receives the data points in a deterministic order. In some embodiments, the data points are sequenced, e.g., as a time sequence of data.

In some embodiments, each data point represents a measurement, e.g., from a sensor. In some embodiments, each data point is a server transaction time. In some embodiments, each data point is a value in a time series. In some embodiments, each data point corresponds to a set of values, e.g., an identifier (such as a identifier for a transaction), an event time (such as a timestamp marking completion of the identified transaction), and a value associated with the event (such as time to completion of the transaction or a timestamp corresponding to the beginning of the transaction).

At stage 520, the monitor node adds, to a window of data, at least a predetermined number of the received data points. In some embodiments, the window of data is a sliding window representing a view of a set of the last received data points. In some embodiments, the monitor node implements the window of data as a first-in first-out (FIFO) queue. In some embodiments, the monitor node implements the window of data using a circular buffer. In some embodiments, if the window of data includes at least a predetermined number of received data points, then the monitor node removes a data point (e.g., the least-recently received data point) whenever it adds a received data point. This keeps the size of the window of data constant once it has accumulated the predetermined number of received data points. In some embodiments, at stage 520, the monitor node populates the window of data with the predetermined number of received data points without considering whether the data points are outliers.

At stage 530, the monitor node determines whether a next received data point is an outlier from the window of data. If it isn't, then at stage 540, the monitor node adds the received data point to the window of data and the method 500 returns to stage 530 to handle another next received data point. In some embodiments, the monitor node determines that a next received data point is an outlier from the window of data by establishing boundaries for the window of data, e.g., a maximum (and/or minimum) value, and then determining whether the next received data point is within the established boundaries. In some embodiments, the monitor node determines that a next received data point is an outlier from the window of data by comparing the next received data point to a mean average of the data represented in the window of data and determining whether the next received data point is within a particular range of the average (e.g., equal to the mean average plus or minus a range such as 1% of the average, within a number of standard deviations from the average, etc.). In some embodiments, the monitor node determines that a next received data point is an outlier from the window of data by comparing the next received data point to an upper (or lower) boundary for the data represented in the window of data. For example, the boundary may be the largest (or smallest) value in the window of data plus (or minus) a buffer (e.g., a percentage of the range from the smallest to largest values). In some embodiments, the boundary is an upper (or lower) quartile of the data represented in the window of data. In some embodiments, the monitor node uses one or more of the following known methods for outlier detection: Tukey's Test, Peirce's Criterion, a mean and standard deviation test such as Chauvenet's criterion or Grubb's test, or any other method for outlier detection.

If at stage 530, the monitor node determines that a next received data point is an outlier from the window of data, then at stage 550, the monitor node updates outlier statistics data. For example, in some embodiments, the monitor node maintains a count of outliers received. In some embodiments, the count of outliers received is a count of consecutive outliers received and the monitor node resets the count of outliers to zero when a non-outlier is received. In some embodiments, the monitor node reduces the count of outliers when a non-outlier is received, e.g., reducing it by one or more, halving it, reducing it by some other fraction, etc. In some embodiments, the monitor node resets the count of outliers to zero when a minimum number of consecutive non-outliers are received (e.g., after two consecutive non-outliers are received). In some embodiments, the monitor node maintains outlier statistics to keep a ratio of outliers detected as compared to non-outliers received.

At stage 560, the monitor node determines whether the count of the received data points determined to be outliers exceeds a predetermined threshold. In some embodiments, the threshold is a configurable number. In some embodiments, the threshold is a number of consecutive received outlier data points that would indicate a behavioral shift in a measured system.

If, at stage 560, the monitor node determines that the threshold has not been met or exceeded, then the method 500 returns to stage 530 to handle another next received data point. In some embodiments, the outlier is not added to the window of data. In some embodiments, prior to (or concurrently with) returning to stage 530, the monitor node signals an administrator or otherwise reports the presence of an outlier.

At stage 570, if the monitor node determines at stage 560 that the count of the received data points determined to be outliers exceeds the predetermined threshold, then the monitor node establishes a new window of data. In some embodiments, the monitor node adds the last identified outlier to the new window of data. The new window replaces the previous window. In some embodiments, at stage 560, the monitor node resets the window of data, e.g., clearing data represented in the window or marking it as stale. In some embodiments, the monitor node uses a counter to track the number of data points added to the window of data at stage 520 and, at stage 560, the monitor node resets the counter such that new data points will be added at stage 520 (replacing older data points) to bring the number of data points represented in the window back up to the predetermined number of data points.

The method 500 returns, after stage 570, to stage 520 where the monitor node adds received data points to the reset window until it again has at least the predetermined number received data points.

In some embodiments, the monitor node analyzes measurements that come from multiple sources, e.g., multiple log files. If trend data is not shared during analysis of the multiple sources, there is more opportunity for invalid data to pollute the baseline, leading to less accurate predictions. For example, in some contexts, measured systems record data to log files (e.g., transaction logs indicating the length of various server transactions) and the monitor node processes the log files, e.g., to validate performance. In some embodiments, the monitor node maintains context data between log files, facilitating seamless analysis across a larger pool of data. This, in turn, can yield improved analysis and better predictions.

In some embodiments, the monitor node calculates a Moving Average. For example, using pre-configured values for a window size N and maximum threshold number of outliers M, the monitor node executes the following routine upon the arrival of a new data point:

```
1.    If a data point number (in a series) is less than N:
2.        Save the data point;
3.        Continue with next received data point;
4.    Otherwise:
5.        Calculate an expected range from a window of N last saved data points;
6.        If the data point is within the expected range:
7.            Save the data point (shifting it into the window);
8.        If the data point is outside the expected range (i.e., if it's an outlier):
9.            If a count of consecutively received outliers >= M:
10.               The data point is now first, and
11.               return to saving N data points;
12.           Otherwise, report the outlier without saving it.
```

Figure 6:
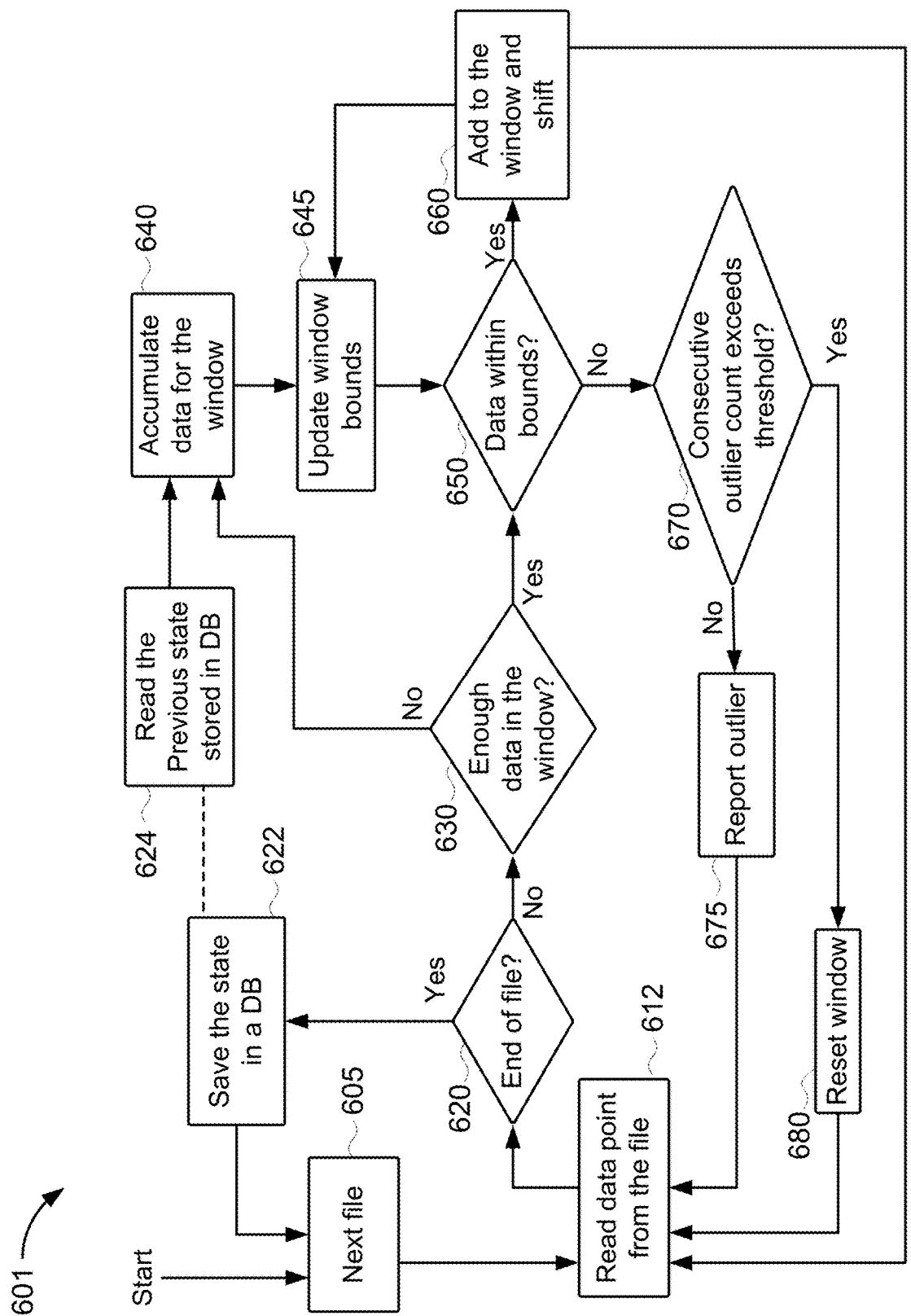
FIG. 6 is a flowchart for an example method of detecting outliers in data read from one or more log files.

FIG. 6 is a flowchart for an example method 601 of detecting outliers in data read from one or more log files. The method 601 has some similarities to the method 500 described above in reference to FIG. 5. In broad overview, in the method 601, the monitor node populates a sliding window with data extracted from log files; the monitor node accumulates data in a sliding window up to a predetermined number of data points (similar to stage 520) and then compares additional data points to boundaries based on the accumulated data in the sliding window (similar to stage 530). The method 601 starts by identifying a first (or next) file. At stage 605, a monitor node receives data from the next file and, at stage 612, reads a data point from the file. At stage 620, the monitor node determines whether it has reached the end of the file. If so, at stage 622, the monitor node saves state information in a database and returns to stage 605 to begin another file. Otherwise, at stage 630, the monitor node determines if there is enough data in a sliding window of data. If not, then at stage 640, the monitor node adds the data point to the sliding window of data. The monitor node accumulates data for the window from these added data points combined with previous state stored in the database, read by the monitor node at stage 624. At stage 645, the monitor node updates window boundaries based on the accumulated data for the window. If, at stage 630, there is enough data in the sliding window for analysis, then at stage 650, the monitor node uses the updated boundaries (from stage 645) to determine whether a received data point is within the bounds. At stage 660, if the data point was within bounds at stage 650, then the monitor node adds the data point to the window and shifts a least-recently added data point out of the window. The method 601 then returns to state 645 and updates the window boundaries. At stage 670, if the data point was not within bounds at stage 650, then the monitor node determines whether a consecutive outlier count exceeds a threshold. If not, the monitor node reports the outlier at stage 675 and continues reading data points from the file at stage 612. Otherwise, if the count of consecutive outliers exceeds the threshold, then at stage 680 the monitor node resets the window of data. In some embodiments, the monitor node includes one or more of the last received outlier data points in a new window of data. The method continues to read data points from the file at stage 612.

Referring to FIG. 6 in more detail, the method 601 starts by identifying a first (or next) file. In some embodiments, a monitor node is configured to analysis log files in a particular location (e.g., a file directory, a uniform resource identifier ("URI") such as a uniform resource locator ("URL"), a database, or any other specific location). In some embodiments, a monitor node is configured to analysis a specific set of log files. The method 601 is described in terms of an endless loop. Each iteration returns to stage 601 to identify a next (initially a first) log file the method 601 iterates through all log files until it runs out of files or is interrupted.

At stage 605, a monitor node receives data from the first (or next) file. In some embodiments, the monitor node reads data directly from the file. In some embodiments, the monitor node reads data for the file from an intermediary source such as a database or repository. In some embodiments, the file is encrypted and the monitor node decrypts the file.

At stage 612, the monitor node reads (or tries to read) a data point from the file. In some embodiments, the file contains structured data, e.g., in a comma-separated format, eXtensible Markup Language ("XML") format, or some other structured format. In some embodiments, the file contains plaintext log entries. In such embodiments, the monitor node parses the log entries and identifies one or more data points from the plaintext log entries. For example, in some embodiments, the plaintext log entries include a structure-formatted portion and an unstructured portion (e.g., an introductory header in a custom format preceding each unstructured portion). In some such embodiments, the monitor node parses the log entries and identifies one or more data points from the structured-formatted portions, e.g., identifying an event identifier and a timestamp from the structured portion.

In some embodiments, each data point represents a value for a metric, e.g., for a performance metric. In some embodiments, each data point represents a measurement, e.g., from a sensor. In some embodiments, each data point is a server transaction time. In some embodiments, each data point is a value in a time series. In some embodiments, each data point corresponds to a set of values, e.g., an identifier (such as an identifier for a transaction), an event time (such as a timestamp marking completion of the identified transaction), and a value associated with the event (such as time to completion of the transaction or a timestamp corresponding to the beginning of the transaction).

At stage 620, the monitor node determines whether it has reached the end of the file. In some embodiments, a read failure at stage 612 indicates end of file. In some embodiments, the monitor node ascertains the number of records in a file and determines that the last record read corresponds to the last record in the file. In some embodiments, the monitor node reads an end of file marker at stage 612 and determines, from the end of file marker, that it has reached the end of file.

At stage 622, if the monitor node determines that it has reached the end of the file at stage 620, then the monitor node saves state information in a database (or other storage system) and returns to stage 605 to begin another file. The state information can then be used to resume the analysis from another file using the same context, e.g., at stage 624. In some embodiments, the monitor node reads data points from the file into a sliding window of most recently read data points and, at stage 622, the monitor node saves or state information for the sliding window, e.g., a copy of the data represented in the sliding window, boundary information for the data represented in the sliding window, a mean average value for the data represented in the sliding window, an expected next value based on the data represented in the sliding window, and/or any other such data representative of the data represented in the sliding window. In some embodiments, the monitor node saves statistics about the log files in the database. For example, in some embodiments, the monitor node keeps statistics about how many outlier data points have been read, how many consecutive outlier data points have been read, etc. Data recovered from the database at stage 624 may be persisted in the database by the monitor node at stage 622. Data persisted in the database at stage 622 may be recovered from the database by the monitor node at stage 622.

At stage 630, if the monitor node determines that it has not reached the end of the file at stage 620, then the monitor node determines if there is enough data in the sliding window of data for analysis. In some embodiments, there is enough data in the sliding window if there is at least a predetermined number of data points represented in the sliding window. In some embodiments, the monitor node keeps track of how many data points are represented in the sliding window, and determines whether there is enough data by comparing the number of data points to a threshold. If, at stage 630, there is enough data in the sliding window for analysis, then the method 601 proceeds to stage 650 to determine whether a received data point is within identified boundaries.

At stage 640, when the monitor node determines that there are not enough data points at stage 630, then the monitor node accumulates more data for the window. The monitor node adds the data point read at stage 612 to the sliding window. In some embodiments, the sliding window is initially empty. In some embodiments, monitor node initializes the sliding window using the previous state data stored in the database, as read by the monitor node at stage 624.

At stage 645, the monitor node updates window boundaries based on the accumulated data for the window. In some embodiments, the monitor node determines, at stage 650, that a next received data point is an outlier from the window of data by establishing boundaries for the window of data, e.g., a maximum (and/or minimum) value, and then determining whether the next received data point is within the established boundaries. In some embodiments, the lower boundary is fixed at zero and the monitor node updates the maximum boundary at stage 645. In some embodiments, the monitor node identifies a mean average of the data represented in the window of data and establishes the boundaries at values above (and, in some embodiments, below) the mean average, e.g., at the mean average plus a buffer amount such as 1% of the average, an amount based on a number of standard deviations from the average, etc. In some embodiments, the monitor node sets the upper boundary at an upper quartile of the data represented in the window of data.

If, at stage 630, there is enough data in the sliding window for analysis, then at stage 650, the monitor node uses the updated boundaries (from stage 645) to determine whether a received data point is within the bounds. In some embodiments, the monitor node uses one or more of the following known methods for outlier detection: Tukey's Test, Peirce's Criterion, a mean and standard deviation test such as Chauvenet's criterion or Grubb's test, or any other method for outlier detection.

At stage 660, if the data point was within bounds at stage 650, then the monitor node adds the data point to the window and, when there is already at least a predetermined number of data points in the window, shifts a least-recently added data point out of the window. In some embodiments, the monitor node uses a circular buffer to represent the sliding window of data, where the circular buffer has capacity for exactly the predetermined number of data points; in such embodiments, adding a new data point overwrites a least-recently added data point. In some embodiments, the monitor node uses a first-in first-out ("FIFO") queue to represent the window of data. Shifting a new value into the queue also shifts a least-recently added value out of the queue. The method 601 then returns to state 645 and updates the window boundaries.

At stage 670, if the data point was not within bounds at stage 650, then the monitor node determines whether a consecutive outlier count exceeds a threshold. The monitor node maintains a count of consecutive outliers detected at stage 650. In some embodiments, the monitor node includes this count in the state information saved at stage 622 and read at stage 624. In some embodiments, the monitor node resets the count whenever it adds a data point to the window at stage 660. In some embodiments, the threshold is a configurable value. In some embodiments, the threshold is a percentage of the number of data points represented in the sliding window. In some embodiments, the threshold is set based on a length of time represented by the data points. For example, in some embodiments, the threshold is set such that if outliers are detected consistently over a length of time, then the consecutive outlier count exceeds the threshold.

At stage 675, when the consecutive outlier count does not exceed the threshold, the monitor node reports the outlier at stage 675 and continues reading data points from the file at stage 612. In some embodiments, the reported outlier is not added to the window of data. In some embodiments, the monitor node reports the outlier by generating a message to an administrator, e.g., by sending an email, sending an SMS text message, generating an automated telephone call, setting an error flag, adding a record to an error log, generating an interrupt, or any other manner of reporting. In some embodiments, the monitor node does use a different reporting mechanism based on the count of consecutive outliers. For example, in some embodiments, the monitor node records a first outlier in an error log file without alerting an administrator, but then alerts an administrator for a second outlier consecutive to the first outlier.

At stage 680, when the consecutive outlier count does exceed the threshold at stage 670, the monitor node resets, refreshes, or replaces the window of data. In some embodiments, the monitor node reports the outlier, e.g., in the same manner described for stage 675. In some embodiments, the monitor node reports the reset event to the administrator. In some embodiments, the monitor node includes one or more of the last received outlier data points in a new window of data. In some embodiments, the monitor node adds the last identified outlier to the new window of data. The new window replaces the previous window. In some embodiments, the monitor node resets the window of data, e.g., clearing data represented in the window or marking it as stale.

The method continues to read data points from the file at stage 612.

In some embodiments, the monitor node may be used by a system to control or regulate the system. For example, a load balancer may distribute workload across a plurality of servers based on expected server transaction times. The monitor node may generate an expected server transaction time from the sliding window of data. For example, the expected server transaction time may be the mean average of measured transaction times represented in the sliding window. If the expected server transaction time for a server in the plurality is above a benchmark, the load balancer may redistribute workload away from the server to improve overall throughput. For example, the benchmark may be some percentage above the average server transaction time for all servers in the plurality.

The systems and methods described may be used in a variety of embodiments. For example, and without limitation:

In at least one aspect, the above describes a method for detecting outliers on a series of data. The method includes receiving, by a device, a plurality of data points and adding, by the device, a received data point to a first window of data comprising at least a predetermined number of received data points from the plurality of data points, responsive to detecting that the received data point is not an outlier from the first window of data. The method includes detecting, by the device, that one or more next data points of the received plurality of data points are outliers from the first window of data and determining, by the device, that a count of the one or more next data points that are outliers exceeds a predetermined threshold. The method includes establishing, by the device, responsive to determining that the count exceeds the predetermined threshold, a second window of data comprising at least one of the one or more next data points.

Some embodiments of the method include adding, to the first window of data, by the device, consecutively received data points from the plurality of data points, up to at least the predetermined number. In some embodiments of the method, the count of the one or more next data points that are outliers is a number of consecutively received data points determined to be outliers. Some embodiments of the method include replacing the first window of data with the second window of data. In some embodiments of the method, the windows of data are represented, by the device, using a first-in-first-out (FIFO) queue, and the method includes shifting the queue to add the received data point while keeping a size of the queue equal to the predetermined number. Some embodiments of the method include detecting whether a given data point is an outlier from the first window of data using a moving average of data in the first window.

In some embodiments of the method, the plurality of data points are values corresponding to performance of a server in a plurality of servers. Some such embodiments of the method include adding, by the device to the second window of data, received data points from the plurality of data points, up to at least the predetermined number; determining an average of data points in the second window; and modifying a load distribution across the plurality of servers responsive to determining that the average is outside a predetermined range.

In some embodiments of the method, the plurality of data points are values corresponding to performance of one or more servers in a plurality of servers, and the method includes modifying a load distribution across the plurality of servers based on values of the performance metric represented in the second window of data. In some embodiments of the method, the plurality of data points are measurements of transaction times at one or more servers in a plurality of servers. In some embodiments of the method, each of the data points are respectively each associated with a corresponding event time and the plurality of data points are sequenced by the corresponding event times.

Some embodiments of the method include receiving, by the device, the plurality of data points from a set of files; adding, by the device, at least one data point from a first file in the set of files to the first window of data; and adding, by the device, at least one data point from a second file in the set of files to the first window of data. Some such embodiments include recording, in storage, data representative of the first window of data and the count of the one or more next data points that are outliers respective to the first file. Some embodiments of the method include receiving, by the device, the plurality of data points from a set of files; adding at least one data point from a first file in the set of files to the first window of data; recording, in storage, data representative of the first window of data and the count of the one or more next data points that are outliers respective to the first file; including, by the device, in the second window of data, the recorded data representative of the first window of data; and adding at least one data point from a second file in the set of files to the second window of data. In some such embodiments, the device uses the recorded count as a starting point for a count associated with the second file.

In at least one aspect, these methods may be encoded as computer-readable instructions for execution by one or more processors. The computer-readable instructions can be encoded on non-transitory computer-readable media.

In at least one aspect, the above describes a system for outlier detection on a series of data. The system includes a processor coupled to memory and configured to execute instructions to receive a plurality of data points; add a received data point to a first window of data comprising at least a predetermined number of received data points from the plurality of data points, responsive to detecting that the received data point is not an outlier from the first window of data; and detect that one or more next data points of the received plurality of data points are outliers from the first window of data. The processor is configured to execute instructions to determine that a count of the one or more next data points that are outliers exceeds a predetermined threshold and to establish, responsive to determining that the count exceeds the predetermined threshold, a second window of data comprising at least one of the one or more next data points.

In some embodiments of the system, the processor is configured to execute instructions to add, to the first window of data, consecutively received data points from the plurality of data points, up to at least the predetermined number. In some embodiments, the count of the one or more next data points that are outliers is a number of consecutively received data points determined to be outliers. In some embodiments of the system, the processor is configured to execute instructions to replace the first window of data with the second window of data. In some embodiments, the windows of data are represented, by the system, using a first-in-first-out (FIFO) queue, and the processor is configured to execute instructions to shift the queue to add the received data point while keeping a size of the queue equal to the predetermined number. In some embodiments of the system, the processor is configured to execute instructions to detect whether a given data point is an outlier from the first window of data using a moving average of data in the first window.

In some embodiments of the system, the plurality of data points are values corresponding to performance of a server in a plurality of servers. In some embodiments of the system, the processor is configured to execute instructions to add, to the second window of data, received data points from the plurality of data points, up to at least the predetermined number; determine an average of data points in the second window; and modify a load distribution across the plurality of servers responsive to determining that the average is outside a predetermined range.

In some embodiments of the system, the plurality of data points are values corresponding to performance of one or more servers in a plurality of servers, and the processor is configured to modify a load distribution across the plurality of servers based on values of the performance metric represented in the second window of data. In some embodiments, the plurality of data points are measurements of transaction times at one or more servers in a plurality of servers. In some embodiments, each of the data points are respectively each associated with a corresponding event time and the plurality of data points are sequenced by the corresponding event times.

In some embodiments of the system, the processor is configured to execute instructions to receive the plurality of data points from a set of files; add at least one data point from a first file in the set of files to the first window of data; and add at least one data point from a second file in the set of files to the first window of data. In some such embodiments, the processor is configure to record, in storage, data representative of the first window of data and the count of the one or more next data points that are outliers respective to the first file. In some embodiments, the processor receives the plurality of data points by reading a file. In some embodiments, the processor receives the plurality of data points by streaming the file, e.g., over a network connection. In some embodiments of the system, the processor is configured to execute instructions to receive the plurality of data points from a set of files; add at least one data point from a first file in the set of files to the first window of data; record, in storage, data representative of the first window of data and the count of the one or more next data points that are outliers respective to the first file; include, in the second window of data, the recorded data representative of the first window of data; and add at least one data point from a second file in the set of files to the second window of data. In some such embodiments, the system uses the recorded count as a starting point for a count associated with the second file.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:
1. A method comprising:
   establishing, by a device, one or more windows of data comprising data points from a plurality of data points that fall within a boundary;
   determining, by the device, that a count of one or more next data points that fall outside the boundary exceeds a threshold of a metric indicative of performance of a monitored device;
   identifying, by the device, a change in performance of the monitored device based at least on the one or more windows of data and the count exceeding the threshold, the one or more windows of data including at least one next data point; and
   providing, by the device, an action executable to address the change in performance of the monitored device.

2. The method of claim 1, further comprising establishing, by the device, a first window of data of the one or more windows to include a predetermined number of the plurality of data points that fall within the boundary.

3. The method of claim 2, further comprising establishing, by the device responsive to determining that the count of one or more next data points that are outliers exceeds the threshold, a second window of data of the one or more windows of data that includes the at least one of the one or more next data points that are outliers.

4. The method of claim 2, further comprising modifying, by the device responsive to determining that the count of one or more next data points that are outliers exceeds the threshold, the data points of the first window of data.

5. The method of claim 2, further comprising establishing, by the device, the first window of data as a baseline to evaluate the metric indicative of performance of the monitored device.

6. The method of claim 1, further comprising identifying, by the device, the change in performance of the monitored device by comparison of the one or more windows of data to a baseline of values of the metric indicative of performance of the monitored device.

7. The method of claim 1, wherein providing the action to take to address the change in performance comprises one of generating an alert or triggering a corrective action.

8. A system comprising:
   a device having one or more processors, coupled to memory, and configured to:
      establish one or more windows of data comprising data points from a plurality of data points that fall within a boundary;

determine that a count of one or more next data points that fall outside the boundary exceeds a threshold of a metric indicative of performance of a monitored device;

identify a change in performance of the monitored device based at least on the one or more windows of data and the count exceeding the threshold, the one or more windows of data including at least one next data point; and provide an action executable to address the change in performance of the monitored device.

9. The system of claim 8, wherein the device is further configured to establish a first window of data of the one or more windows to include a predetermined number of the plurality of data points that fall within the boundary.

10. The system of claim 9, wherein the device is further configured to establish, responsive to determining that the count of one or more next data points that are outliers exceeds the threshold, a second window of data of the one or more windows of data that includes the at least one of the one or more next data points that are outliers.

11. The system of claim 9, wherein the device is further configured to modify, responsive to determining that the count of one or more next data points that are outliers exceeds the threshold, the data points of the first window of data.

12. The system of claim 8, wherein the device is further configured to identify the change in performance of the monitored device by comparison of the one or more windows of data to a baseline of values of the metric indicative of performance of the monitored device.

13. The system of claim 8, wherein the device is further configured to provide the action to take to address the change in performance comprising one of generating an alert or triggering a corrective action.

14. The system of claim 8, wherein the monitored device comprises one of a client, a server, an appliance or a virtualized environment.

15. A system comprising:

a device having one or more processors, coupled to memory, and configured to:

establish a sliding window of data comprising data points from a plurality of data points that fall within a lower boundary and upper boundary of the sliding window;

identify one or more next data points that are outliers based on falling outside the lower boundary and the upper boundary, the one or more next data points represent a measurement associated with the monitored device;

determine that a count of the one or more next data points exceeds a threshold of a metric indicative of a performance of a monitored device;

adjust, responsive to the determination, one of the lower boundary or the upper boundary of the sliding window;

identify a change in behavior of the monitored device based at least on the sliding window and the count exceeding the threshold; and trigger an action executable to address the change in behavior of the monitored device.

16. The system of claim 15, wherein the device is further configured to establish the sliding window of data to comprise a predetermined number of the plurality of data points that fall between the lower boundary and the upper boundary.

17. The system of claim 15, wherein the device is further configured to establish the sliding window of data from a plurality of data points received via a log file.

18. The system of claim 15, wherein the device is further configured to modify, responsive to determining that the count of one or more next data points that are outliers falling outside the lower boundary and the upper boundary exceeds the threshold, the sliding window to include the at least one of the one or more next data points that are outliers.

19. The system of claim 15, wherein the device is further configured to identify the change in behavior of the monitored device by comparison of values of one or more next data points of the sliding window to a baseline of values of measurements of the monitored device.

20. The system of claim 15, wherein the device is further configured to trigger the action comprising one of an alert or a corrective action.

* * * * *